(12) United States Patent
Kurdziel et al.

(10) Patent No.: US 8,873,759 B2
(45) Date of Patent: Oct. 28, 2014

(54) ELECTRONIC KEY MANAGEMENT USING PKI TO SUPPORT GROUP KEY ESTABLISHMENT IN THE TACTICAL ENVIRONMENT

(71) Applicant: Harris Corporation, Melbourne, FL (US)

(72) Inventors: Michael Thomas Kurdziel, Rochester, NY (US); Peter Bajorski, Fairport, NY (US); Alan Kaminsky, Rochester, NY (US); Marcin Lukowiak, Rochester, NY (US); Stainslaw Radziszowski, West Henrietta, NY (US); Christopher Wood, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 115 days.

(21) Appl. No.: 13/762,881

(22) Filed: Feb. 8, 2013

(65) Prior Publication Data

US 2014/0226821 A1     Aug. 14, 2014

(51) Int. Cl.
*H04L 29/06*     (2006.01)
*H04L 9/08*     (2006.01)
*H04L 9/00*     (2006.01)

(52) U.S. Cl.
CPC ............ *H04L 9/0827* (2013.01); *H04L 9/0819* (2013.01); *H04L 63/065* (2013.01); *H04L 9/0836* (2013.01); *H04L 9/007* (2013.01)
USPC ........................................................ 380/278

(58) Field of Classification Search
CPC ..... H04L 9/0836; H04L 9/0827; H04L 9/007; H04L 63/065
USPC ........................................................ 380/278
See application file for complete search history.

(56) References Cited

U.S. PATENT DOCUMENTS

| 2002/0059516 | A1* | 5/2002 | Turtiainen et al. ............ 713/153 |
| 2007/0140480 | A1* | 6/2007 | Yao ................................. 380/30 |
| 2008/0186950 | A1* | 8/2008 | Zhu et al. ...................... 370/350 |
| 2009/0292914 | A1* | 11/2009 | Liu et al. ........................ 713/153 |
| 2012/0222089 | A1* | 8/2012 | Whelan et al. ..................... 726/3 |
| 2012/0243683 | A1* | 9/2012 | Oba et al. ...................... 380/255 |
| 2012/0324218 | A1* | 12/2012 | Duren et al. ................... 713/158 |

OTHER PUBLICATIONS

Steiner, Michael, Gene Tsudik, and Michael Waidner. "Key agreement in dynamic peer groups." Parallel and Distributed Systems, IEEE Transactions on11.8 (2000): 769-780.*
International Search Report and Written Opinion mailed Aug. 7, 2014 in International Patent Application No. PCT/US2014/015023 to Harris Corporation (10 pages).

* cited by examiner

*Primary Examiner* — Kambiz Zand
*Assistant Examiner* — Michael Guirguis
(74) *Attorney, Agent, or Firm* — Fox Rothschild LLP; Robert J. Sacco, Esq.

(57) ABSTRACT

Method for distributing a group session cryptographic key includes initiating at least one pairwise key distribution session including a root node (100) and at least one communication node (101-107). The method further includes performing at a communication node which has received the group session cryptographic key a propagated pairwise key distribution session with at least one of the communication nodes which has not previously received said group session cryptographic key. The propagated pairwise key distribution sessions are performed at each of the communication nodes which subsequently receives the group session cryptographic key until the group session cryptographic key has been securely provided to all authorized communication nodes.

20 Claims, 10 Drawing Sheets

ELECTRONIC KEY MANAGEMENT USING PKI TO SUPPORT GROUP KEY ESTABLISHMENT IN THE TACTICAL ENVIRONMENT

BACKGROUND OF THE INVENTION

1. Statement of the Technical Field

The inventive arrangements relate to electronic key management and more particularly to electronic key management using a public key infrastructure.

2. Description of the Related Art

With the growing pervasiveness of decentralized tactical networks, it is becoming increasingly important to ensure that communication between nodes in such networks remains secure. Electronic key management is the mechanism through which common keys are agreed upon or established in order to encrypt and decrypt sensitive data that cannot be sent over the air in plaintext. Currently, such key management schemes rely on either a centralized control station and existing infrastructure to distribute keys among nodes in a group, a certain amount of preplaced information within each node prior to each mission that enables the reconstruction of shared keys, or a computationally intensive public-key infrastructure to generate shared keys on demand. Each of these approaches is accompanied with application-sensitive limitations that make them suitable for various scenarios. However, in the context of tactical wireless networks, nodes face a threat of being compromised, which in turn results in a relatively high threat to the group key, or any individual security association.

In addition, a number of key management challenges are encountered when managing tactical communication systems. A large portion of tactical communications occurs over low bandwidth channels that are susceptible to natural and deliberate interference. Current over-the-air rekeying protocols are not practical because of the amount of time that can be consumed. Current key material is essential to the security of a mission and an expedient means of obtaining the material is therefore necessary. Current over-the-air rekeying protocols can be relatively slow and therefore are not entirely satisfactory. Another problem with conventional over-the-air rekeying protocols concerns the use of communication channel bandwidth. Communication channel bandwidth is a limited resource and must be available at any time for mission action. Occupying significant amounts of air time for any maintenance operation (such as over-the-air re-keying) is unacceptable. This has resulted in an off-line "PrePlaced Key (PPK)" approach being the most acceptable key distribution method currently available.

Installation of PPK material prior to the start of a mission, even though a manual operation, is straightforward and safe to execute. Intra-mission rekey of these systems is another matter; a security officer must use a "Fill Device" to physically carry and load key material to each node. Under battlefield conditions, this operation can be life threatening to the security officer. Lastly, enabling group membership is straightforward. A member is authorized, authenticated and then given the group key. In contrast, revoking group membership requires a full intra-mission rekey. As previously stated, this can be a dangerous operation in a battlefield situation.

Internet Protocol Security (IPsec) is a protocol suite which is used to secure Internet Protocol (IP) communications. The system involves authentication and encryption of IP packets communicated during a network communication session. Notably, IPsec also includes protocols which are provided to allow nodes to authenticate each other upon initiation of a communication session and thereafter to negotiate a cryptographic key which will be used by the nodes to communicate during the session. IPsec utilizes the idea of a security association (SA) as a building block for purposes of creating a secure communication session. A security association is comprised of a defined set of algorithms and parameters (such as cryptographic keys) that are used to encrypt and authenticate a flow of data in one direction. For purposes of communicating bi-directional traffic, the flow of data in each direction is secured by its own security association.

Security associations in IPsec can be established several means, including the Internet Key Exchange (IKE) protocol. IKE is used in IPsec to conduct a point-to-point authenticated key exchange to establish a security association between two parties in a network. It is considered a hybrid protocol because it is based on the Internet Security Association and Key Management (ISAKMP) and Oakley protocols; two widely used key management schemes. ISAKMP is responsible for secure session management between two peer nodes in a network; whereas Oakley defines the mechanisms for the actual key exchange over the IKE session. The key exchange mechanism used by both Oakley and IKE is the Diffie-Hellman Key Exchange protocol, which is a widely used technique for establishing a common key among two (or more) parties by relying on the computational intractability of the discrete logarithm problem. Notably, the IKE protocol is constrained in that it can only construct point-to-point security associations.

Key management protocols can based on several different approaches which include (1) centralized group key management (2) decentralized key management, and (3) distributed group key management methods. Centralized group key management protocols utilize an existing infrastructure, often called the Key Distribution Center (KDC), in order to control the set of keys used by members of an entire group. When a KDC, is used a key manager provides a group cryptographic key to each member of the group and sequentially uses each member's individual key to securely communicate the group key to that particular group member. Whenever a group member is removed from the group, the key manager must perform n encryptions and transmit n keys. Another problem with the KDC approach is that all group communication is comprised if the KDC is compromised.

Decentralized group key management protocols elect specific nodes (or groups of nodes) to act on behalf of a single KDC, thus breaking the problem of key management up into one that targets many smaller groups. While this does not explicitly rely on a single location to oversee key management for the entire group, the subgroup key managers are single points of failure for the entire group and must be chosen and protected carefully. Notably, in a decentralized group key management protocol, only the nodes in a specific, small subset act as key distributors. Most of the nodes do not act as key distributors and instead are configured so that they merely receive the key, without acting to distribute same.

Distributed group key management protocols are relatively recent schemes that are commonly used in industry, where every single node participates in some way to generate a common group key for all members. Many derivatives of this protocol family have been proposed, including the Group Diffie-Hellman Key Exchange (G-DH), Octopus Protocol, and the Password Authenticated Multi-Party Diffie-Hellman Key Exchange Protocol (PAMPDHKE). Unfortunately, most Diffie-Hellman based protocols are computationally intensive and are executed recursively in a point-to-point manner between pairs of nodes in the group until a security association is established between all members. In addition, any authentication schemes that are layered on top of such protocols are also point-to-point.

SUMMARY OF THE INVENTION

The invention concern a method for securely distributing a group session cryptographic key for a group communication session to a group of communication nodes. The method involves initiating at least one pairwise key distribution session including a root node and at least one of the communication nodes, and securely providing to each of the communication nodes participating in the pairwise key distribution sessions a group session cryptographic key. At least one communication nodes which has received the group session cryptographic key participates in a propagated pairwise key distribution session with at least one of the communication nodes which has not previously received the group session cryptographic key. During this session, the node which already has the key securely provides it to the communication node which has not previously received the group session cryptographic key. The process continues in this way, with the communication nodes continuing to perform the propagated pairwise key distribution sessions as each of the communication nodes subsequently receives the group session cryptographic key. The key distribution ends when the group session cryptographic key has been securely provided in this way to all authorized ones of the group of communication nodes. Once the group session cryptographic key has been distributed to the authorized nodes, they participate in a group communication session using the group session cryptographic key.

The invention also concerns a communication system which includes a root node and a group of communication nodes, each comprising a computer processor device and a communication transceiver. The root node and the group of communication nodes are configured to communicate in a group communication session using a group session cryptographic key. The root node is responsive to a key distribution initiation event to initiate at least one pairwise key distribution session with at least one of the group of communication nodes. During such session, it securely provide to each of the communication nodes participating in the pairwise key distribution sessions a group session cryptographic key. The group of communication nodes receiving such key are configured to respond by initiating their own propagated pairwise key distribution sessions with others of the communication nodes which have not previously received the group session cryptographic key. The group of communication nodes are configured to continue to perform the propagated pairwise key distribution sessions at the communication nodes which subsequently receive the group session cryptographic key until the group session cryptographic key has been securely provided to all authorized ones of the group of communication nodes.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
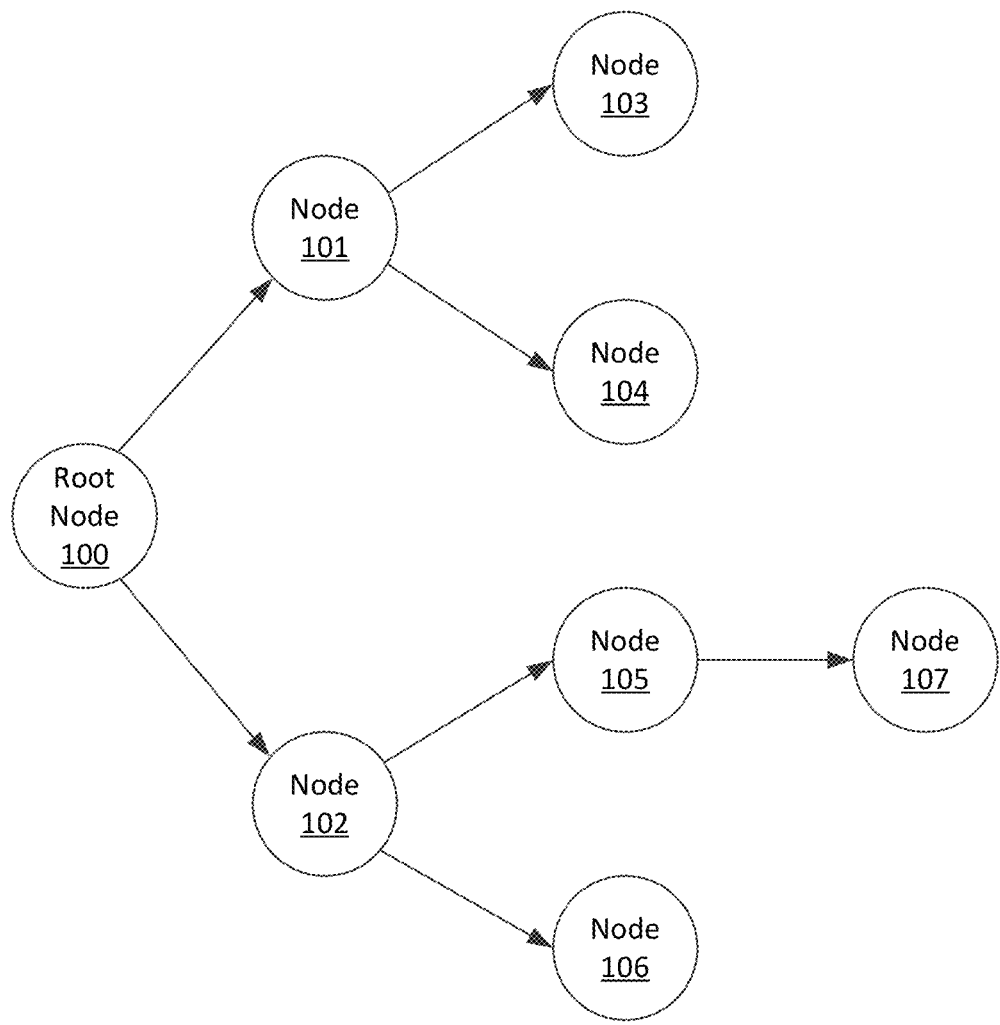
FIG. 1 is an exemplary spanning tree representing a network that is useful for understanding the invention.

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Depending on the context in which a key management protocols is utilized, there are many performance requirements that must be satisfied under constraints imposed by either the operators or the physical environment itself. Common constraints include limited channel bandwidth, limited computational resources on behalf of each node, and limitations on the amount of preplaced information located within each node at the start of a mission. An additional functional constraint for the protocol is that it is simple to add new members to the group, but hard to remove a single member from the network group. This is because removing a member requires an entire network rekey. Aside from the performance requirements for such protocols, they must also be secure against common attacks, including variations of the popular man-in-the-middle attack.

In light of the performance and security requirements for key management protocols, a mode of operation is proposed which utilizes a conventional security protocol for establishing a secure association between pairs of nodes, but offers several advantages over conventional key management methods. The method can be used in a variety of different types of communication systems including ad-hoc networks (e.g. a MANET type network) and more centralized communication systems (such as LMR or tactical radio systems) where communications are primarily through a central node (e.g. a base station). The proposed mode of key distribution is referred to herein as the Viral Electronic Key Exchange (VEKE) protocol. This protocol includes the establishment of multiple simultaneous security associations between more than one pair of nodes in a group at a time. This technique allows parallel operations to occur to the greatest possible extent within the limitations of the underlying spanning tree formation of the nodes in the group, because the highly computational portions of the protocol are done in parallel. Once unique security associations have been established for all members of the group, these security associations are used to distribute a common group cryptographic key from a single key manager across the corresponding network spanning tree.

The security of this mode of operation is directly reducible to that of the security protocol used to set up the security associations, and thus it is possible to attain high security measures and performance by establishing security associations between pairs of nodes in a group in parallel.

Any suitable security protocol can be used for establishing security associations as described herein. For example, the IKE security association can be used for this purpose. The IKE security protocol is well known in the art and therefore will not be described here in detail. However, those skilled in the art will appreciate that IKE is commonly used to negotiate IPSec security associations. This process begins with two IPSec systems (e.g. two network nodes) first authenticating themselves to each other. The process continues by the two IPSec systems establishing IKE shared keys. This process is commonly referred to as an IKE security association. The key exchange mechanism used in IKE is the Diffie-Hellman Key Exchange protocol. Once an IKE secure channel has been established by the two IPSec systems data can be securely communicated between the two systems. When IKE is used as a precursor for setting up an IPSec session, IKE is followed by a second stage in which the two IPSec entities negotiate IPSec security associations and the necessary cryptographic keys are generated for an IPsec session. A new Diffie-Hellman agreement may be established in this second stage of the process, or the cryptographic keys to be used for the IPSec session can be derived from the keys that used during the IKE secure communication session. Once the IPSec session has been established, data is transferred between the two IPSec entities based on the agreed upon security parameters.

For purposes of the present invention, a group cryptographic key which is propagated to the nodes comprising a network can be communicated during an IKE security association session. Alternatively, an IPSec session can be established following the IKE security association, and the group cryptographic key can be transferred during the IPSec session. Alternatively, any other suitable security protocol can be used to set up the security association. For convenience with respect to the present disclosure, cryptographic key distribution will be generally described as occurring during an IKE session. In the present invention, the security associations which are set up as described herein are intended primarily or exclusively for communicating group key data. As such, the security associations can be terminated upon completion of the group key distribution. Such termination can be configured to occur automatically (e.g. the security association can be configured to time out). Alternatively, the security association can be actively controlled by the participating nodes.

It should be noted that the security associations provided by IKE and IPSec are constrained so that they can only include point-to-point security associations between pairs of nodes. In the setting up of ad-hoc networks, group-wide associations are needed to transmit a group session key from a single node all other nodes in the least possible elapsed time. Fortunately, modern waveforms and radios do permit parallelization (concurrent communications among nodes). The key distribution protocol disclosed herein takes advantage of this fact and the point-to-point nature of the IKE and IPSec protocols by distributing the work associated with authentication and establishment of security associations among the node pairs in the network. This allows the authentication, security association, and group key distribution process to be performed in parallel, thereby greatly increasing the rate at which the re-keying event can be completed.

In a conventional decentralized group key management protocol, only the nodes in a specific, small subset act as key distributors; most of the nodes do not act as key distributors and merely receive the key. In contrast, the present invention concerns a system in which all nodes can potentially act as key distributors. Furthermore, the nodes that act as key distributors are determined dynamically as the key distribution protocol progresses, they are not statically determined beforehand. This makes the present invention more tolerant of node failures.

Referring now to FIG. 1, there is shown an exemplary spanning tree structure for a network. An assumed topology for the network in FIG. 1 consists of a single root node 100. The root node is responsible for initiating rekey events for distributing a new group session cryptographic key to the remaining nodes 101-107 in the group. The re-key events can be controlled by a root key manager process (not shown) executing at the root node. Once a rekey event is initiated by a root key manager, the root node 100 will complete security associations with its child nodes 101, 102 (excluding any child nodes that are not authorized receive the new key). These child nodes will then complete security associations with their child nodes 103, 104, 105, 106, once again excluding any child nodes that are not authorized to receive the new key. This process is repeated until secure communication links have been established with respect to all authorized nodes in the group by means of such security associations. Notably, the rate that these security associations are established is limited only by the physical transceiver properties of each node and multiplexing scheme of the waveform used to transmit data. In one embodiment of the invention utilizing this protocol, the waveform used comprises a Time Division Multiple Access (TDMA) slotting scheme whereby each node can have scheduled node access to the waveform. Still, the invention is not limited in this regard and other waveforms can optionally be utilized as well.

The root node 100 can communicate the new group session cryptographic key to its child nodes 101, 102 as soon as the security associations with such child nodes have been established. Similarly, the child nodes 101, 102 of the root key can communicate the new group session cryptographic key to their child nodes 103, 104, 105, 106 once they have established security associations with such child nodes. The process continues in this way until all authorized nodes have received the new key. Although each node can communicate the new group session cryptographic key to its child nodes as soon as it has established security associations with such child nodes, the invention is not limited in this regard. In other embodiments, the root node 100 may delay sending the new key to its child nodes for some period of time. For example, the root node could wait until some or all of the security associations to be established among other nodes in the network before communicating the new cryptographic session key. In either scenario, the group session cryptographic key is ultimately communicated to each child node after a security association has been established with respect to that child node.

As noted above, security associations and session key transmission occurs only with respect to authorized nodes. Accordingly, upon initiation of the re-key events described herein, the root key 100 is provided with a list which is sufficient to identify any unauthorized nodes. For example, the list can contain information which identifies all authorized nodes, in which case a node that is not included in such list will be deemed an unauthorized node. Alternatively, the list can simply specify all unauthorized nodes. In some embodiments, each node can be provided with a digital certificate (e.g. a PKI certificate) that is sufficient to authenticate and identify such node. As such, the digital certificate can include a public cryptographic key which can be used for establishing secure communication with that particular node and a name or serial number associated with that particular node. The list used for identifying unauthorized nodes as described herein can specify such digital certificate information unique to each node so as to definitely specify which nodes are authorized and which nodes are note.

The authorized node list as described herein will be initially used by the root node to determine whether security associations should be established and session key transmission should occur with respect to child nodes 101, 102. Thereafter, the list will be communicated to each child node 101, 102 of root node 100 which is identified as an authorized node. The list can be provided before or after transmission of the new cryptographic session key. The list will thereafter be propagated in a similar way to each of the remaining nodes 103-107, to the extent they are identified as authorized nodes. If a node is not specified as an authorized node on such list, then it will be deemed an unauthorized node. In such as scenario, a parent node will not establish a security association with the unauthorized node and the new group session cryptographic key will not be communicated to such node. Accordingly, re-keying of the network will occur without providing the new group session cryptographic key to any unauthorized node.

Figure 2:
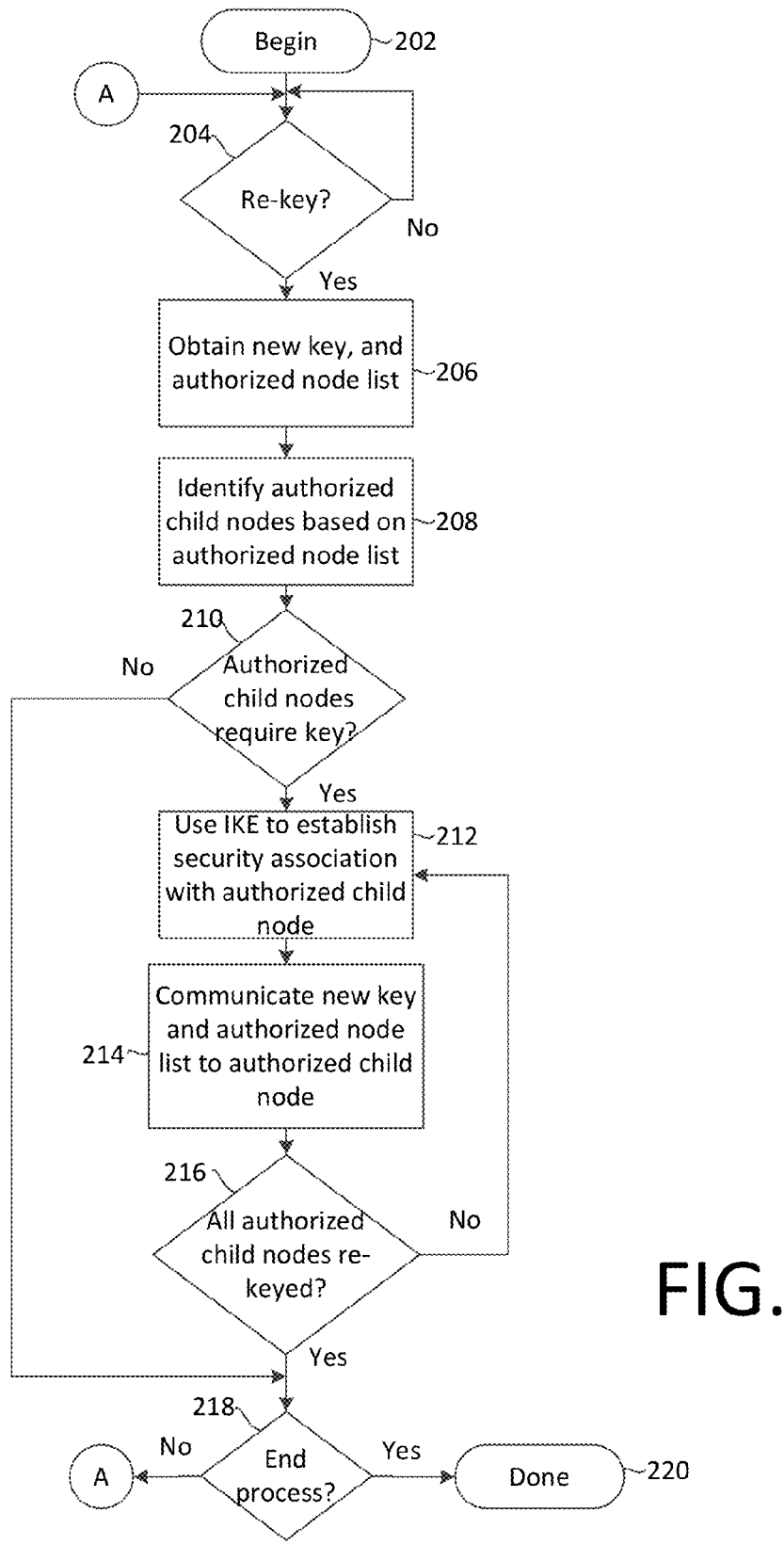
FIG. 2 is a flowchart that is useful for understanding a process implemented in a root node for initiating a re-keying event in a network.

Referring now to FIG. 2, there is shown a flowchart that is useful for understanding the rekeying process as it occurs in a root node 100. The process begins in step 202 and continues on to step 204 at which a determination is made as to whether a re-keying process should be initiated. In no re-keying instruction is received (204: No), the process simply continues to wait for instructions. If a rekey instruction is received (204: Yes), then the root node obtains a new cryptographic session key and an authorized node list. The decision to initiate a re-keying of the network can be made by a root node manager process executing on the root node. Alternatively, initiation of the re-key events as described herein can be made by the root node manager process responsive to a user input at the root node. In a further alternative embodiment, the re-key event can be initiated by a remote operation center or a remote control operator associated with the root node. The authorized node list can similarly be provided by a remote operation center or selected by a control operator at the root node. The new cryptographic session key can be obtained by any suitable means. For example, it can be selected by a user, generated by the key manager process at the root node, or generated at the remote operation center and securely communicated to the root node. As a further alternative, the new cryptographic session key can be pre-stored at the root node.

Each node 100-107 will maintain a list of its own child nodes. This list can be established and maintained by any suitable means. In a static network, the list of child nodes can be manually entered into each node by a control operator. In an ad-hoc network, the list of child nodes can be maintained by each node independently. For example, in a mobile ad-hoc network (MANET), each node can discover adjacent nodes by communicating periodically with other nodes that are within a predetermined adjacent area. When a new node enters a geographic or network communication area, it can be identified as a leaf or child node of an existing node in the network. Likewise, as nodes leave a network communication area or otherwise become inactive, they can be de-listed as child nodes. A complete discussion of MANET networks is beyond the scope of this disclosure. However, techniques and methods for maintaining such networks (including methods for maintaining lists of adjacent nodes) are known in the art and therefore shall not be described here in detail.

Once the root node has obtained the new cryptographic session key and authorized node list, it can at 208 compare the authorized node list to its own list of child nodes. In so doing, it can identify at 208 any authorized ones of its child nodes based on the authorized node list. Thereafter, a determination is made at 210 as to whether there exist any authorized child nodes that have not yet been provided with the new cryptographic session key. If there are no authorized child nodes which require such re-keying (210: No), the process terminates at 218. Otherwise, if there are authorized child nodes that have not been re-keyed (210: Yes) then the process continues on to 212.

At 212, the root key 100 will establish a conventional security association with an authorized child node (e.g. an IKE security association). The various steps associated with conventional security associations such as IKE are well known and therefore will not be described here. However, once the security association has been established at 212, the root key will communicate at 214 the new cryptographic session key to the authorized child node. Also communicated by the root node to its authorized child node(s) is the authorized node list. The authorized node list can be communicated before or after the new group session cryptographic key has been communicated. At 216 a determination is made as to whether all authorized child nodes of the root key have now been provided with new group session cryptographic key. If not, the process returns to 212 at which point steps 212, 214 are repeated with the next authorized child node 101, 102. The process continues in this way until all authorized child nodes of the root node 100 have been provided with the new group session cryptographic key and the list of unauthorized nodes. At this point, the root node has completed its re-keying activity with respect to its child nodes and the process can continue on to 218, where a determination is made as to whether the key manager process should be terminated. If so (218: Yes) then the process terminates at 220; otherwise the process returns to step 204 as shown in FIG. 2.

Figure 3:
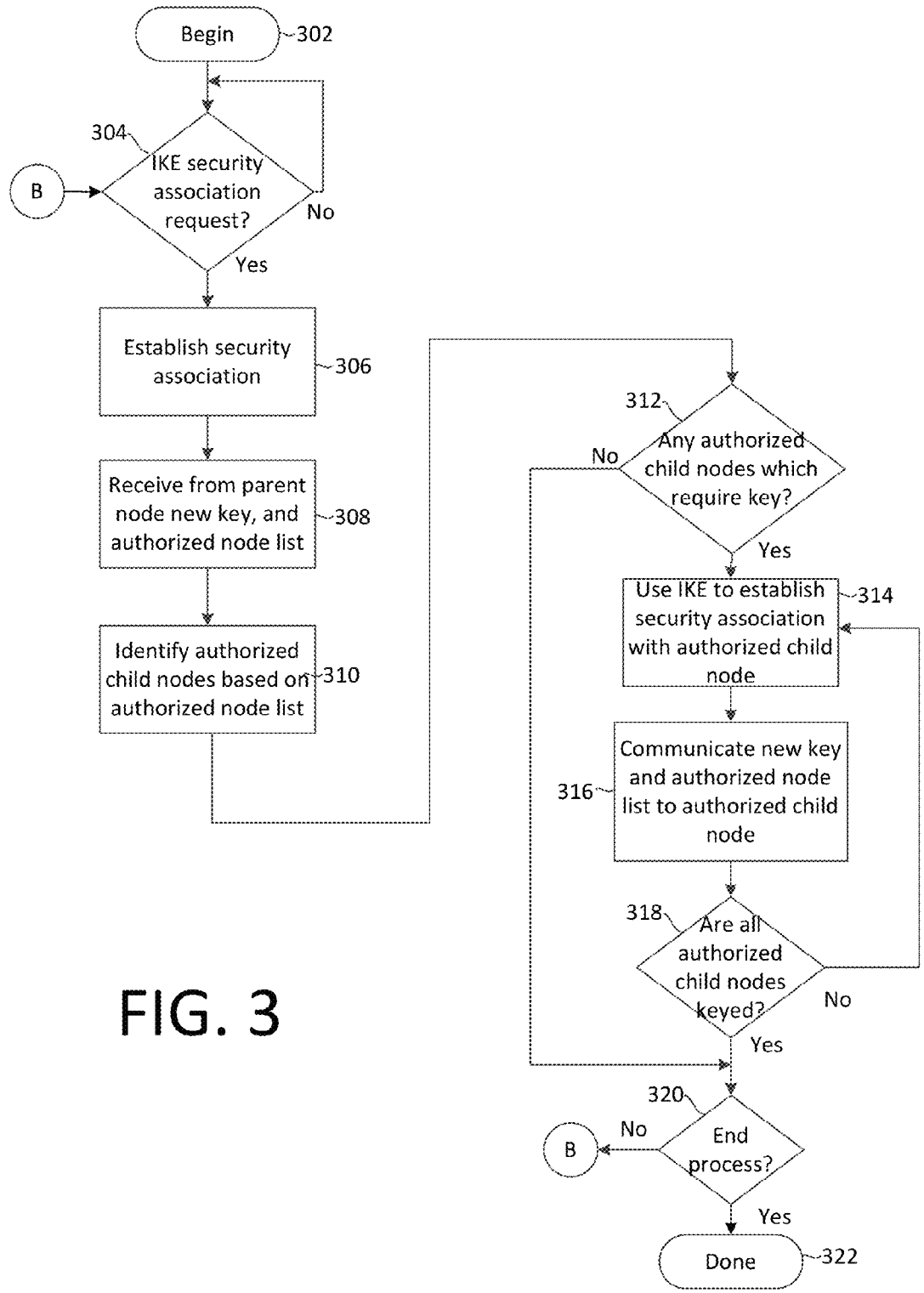
FIG. 3 is a flowchart that is useful for understanding a process implemented in a plurality of child nodes for distributing a cryptographic session key.

Referring now to FIG. 3, there is a flowchart that is useful for understanding the process performed by each child node (e.g. child nodes 101-107). The process is similar to the one performed by the root node 100, but can vary in some respects as will be apparent from the following description. The process begins at 302 and continues on to 304 where a determination is made as to whether a parent of the child node is requesting to initiate a security association (e.g. an IKE security association). If no session is being requested, the process simply returns to 304 and continues to wait for such occurrence. If a session is requested (304: Yes), then the child node (e.g. node 102) proceeds to 306 at which point a security association is established with the parent node using conventional methods as known in the art. After initiating the security association the child node at 308 receives from its parent node a new cryptographic session key, and the list of authorized nodes.

At 310, the child node (e.g. node 102) compares the list of authorized nodes to its list of child nodes to identify which of its child nodes (e.g. nodes 105, 106) are authorized nodes. The process then continues on to 312 where a determination is made as to whether there exist any authorized child nodes which need to receive a new cryptographic session key. For example, at 312 node 102 could consult its authorized node list and determine that its child nodes 105,106 are authorized nodes and need to receive the new session key. If there are existing child nodes requiring a new session key (312: Yes) then the process continues on to 314.

At 314, the node (e.g. node 102) uses a security protocol such as IKE or IPSec to establish a security association with its authorized child node (e.g. node 105). After the security association has been established between the two nodes, the node (e.g. node 102) communicates the new cryptographic session key and the authorized node list to its child node (e.g. child node 105). At 316, a determination is made as to whether the new session key has now been communicated to all authorized child nodes. If all authorized child nodes (e.g. node 106) have not received the new cryptographic session key (318: No) then the process returns to 314 where a security association would be established with the next node (e.g., child node 106 in this example). Otherwise, if all authorized children of a particular node have been re-keyed (318: Yes) then the process continues on to 320. At 320, a determination is made as to whether the process should be terminated. If so, the process terminates at 322. Otherwise, the process returns to 304, where the process continues as shown.

Figure 4:
FIGS. 4-9 are a set of drawings that are useful for understanding the manner in which a cryptographic session key can be distributed in a network.
Figure 5:
Figure 6:
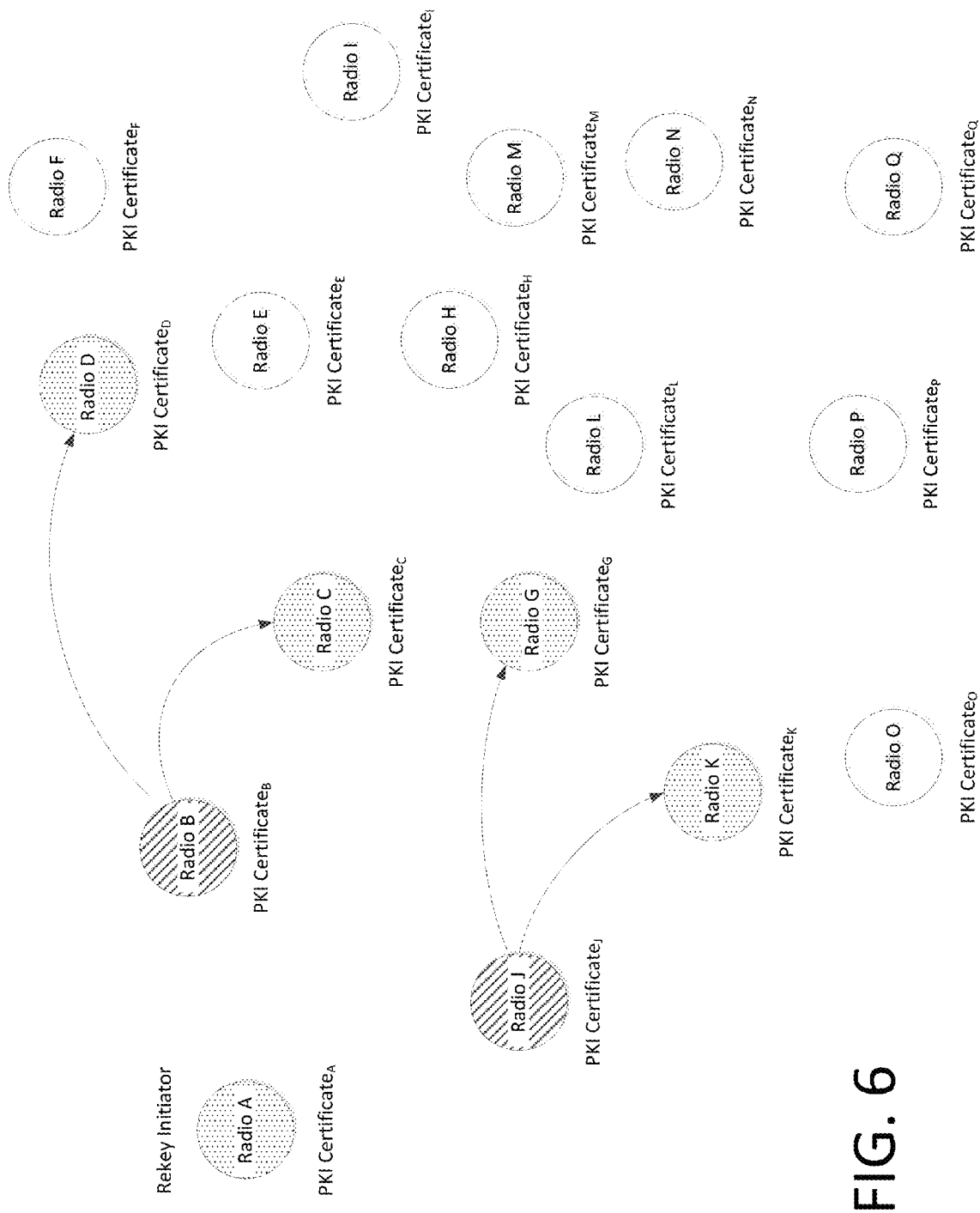
Figure 7:
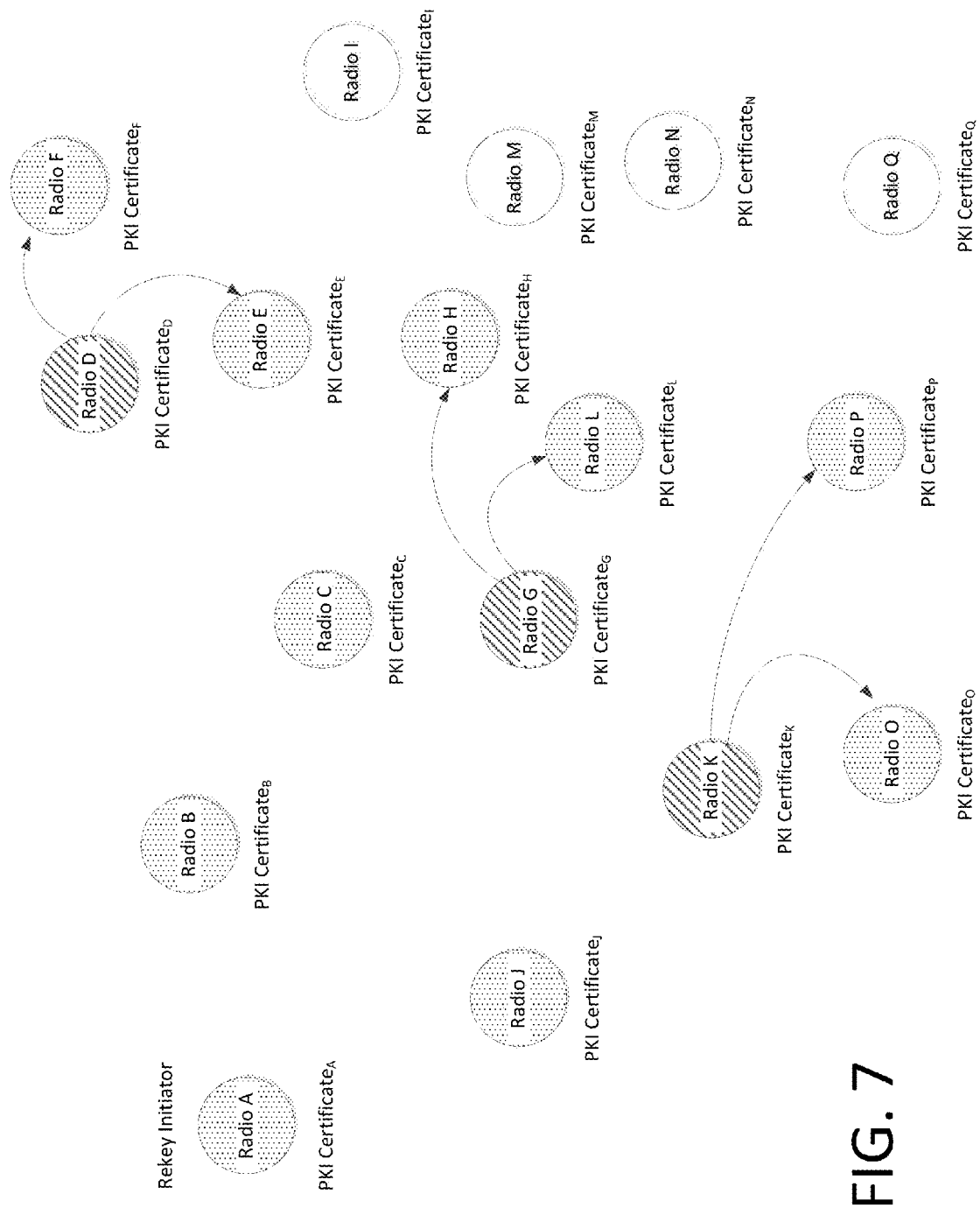
Figure 8:
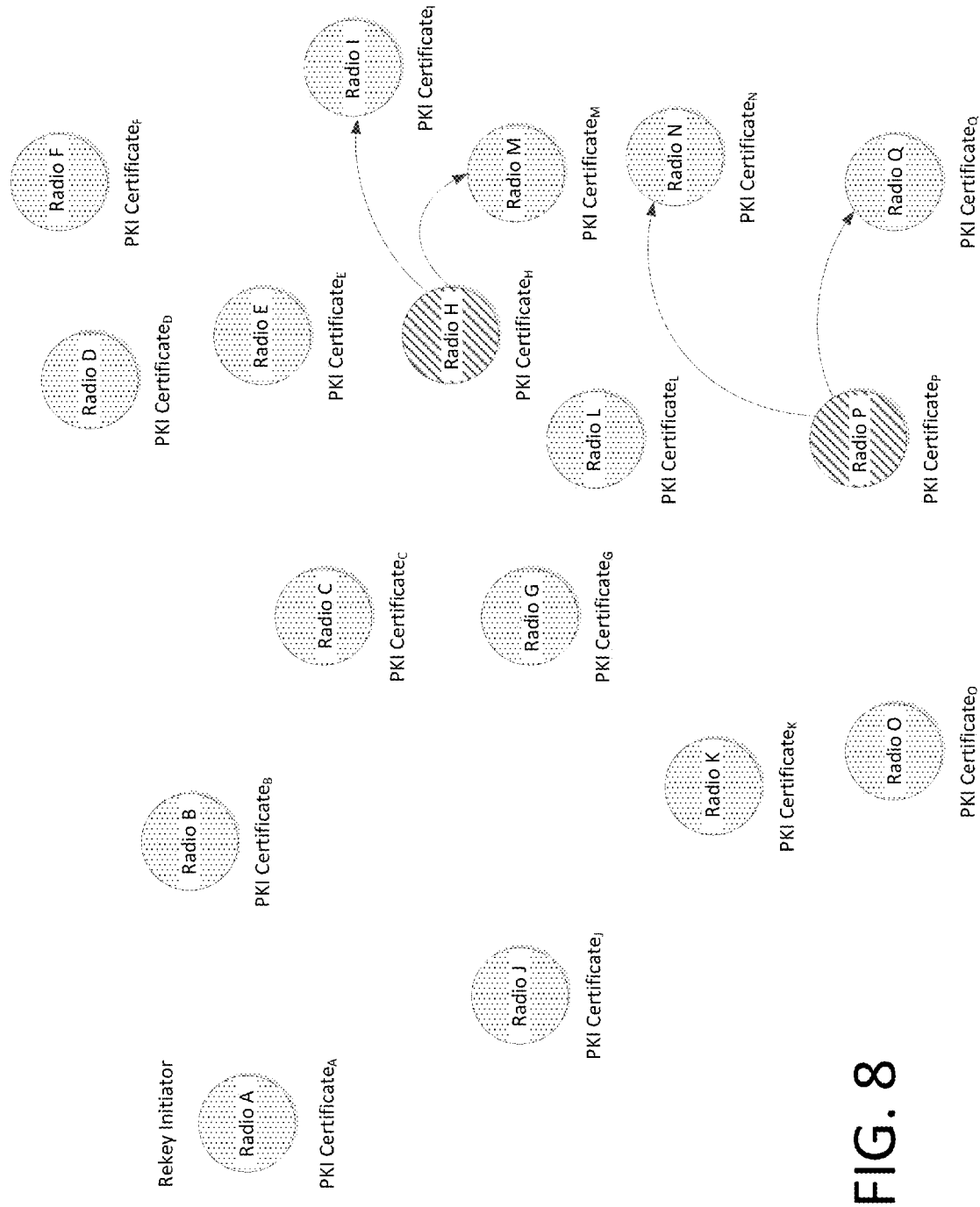
Figure 9:
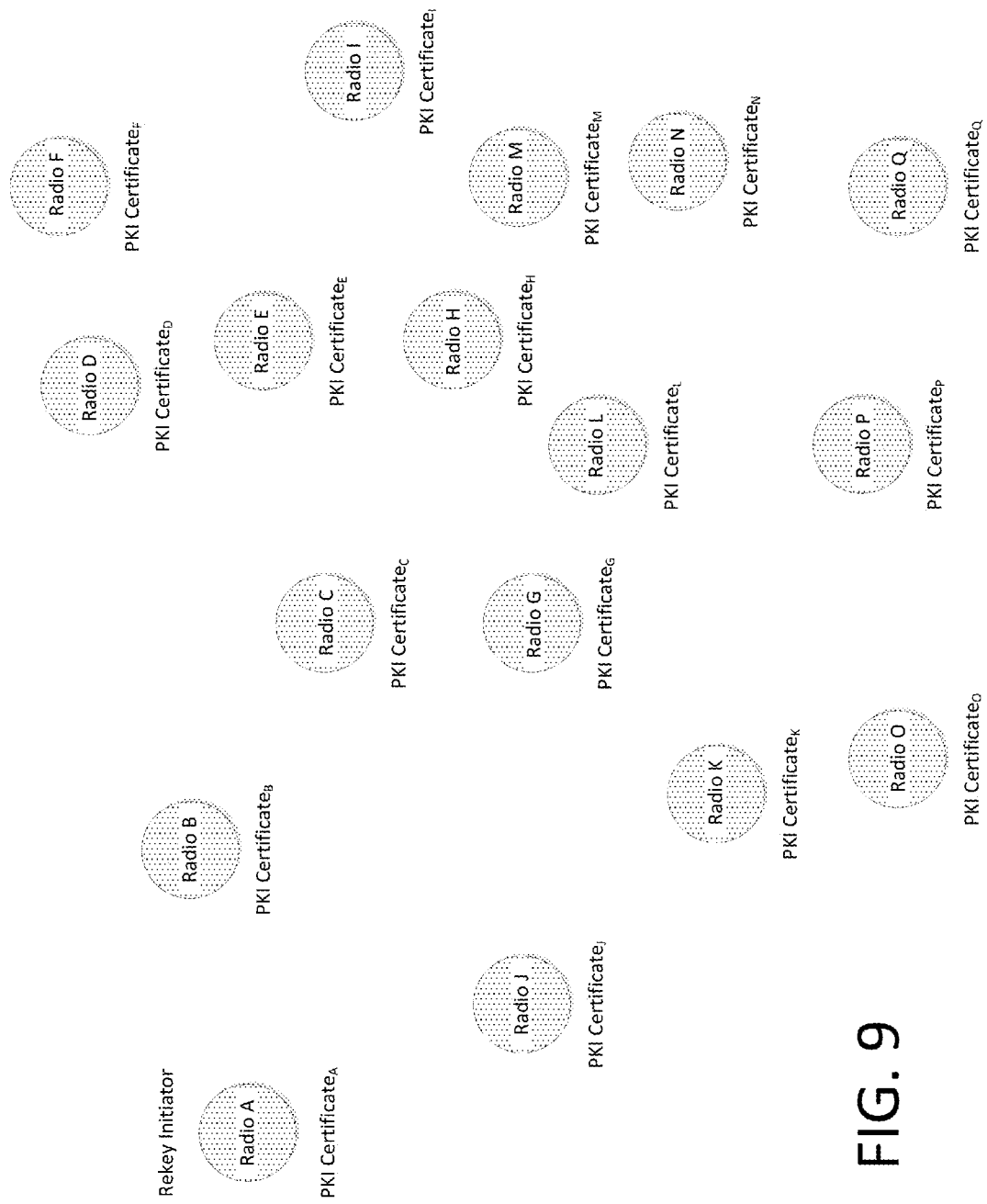

Turning now to FIGS. 4-9, there is provided an example in which a rekey is initiated by Radio A in a mobile ad-hoc network consisting of Radios A-Q. In FIG. 4, re-keying of the network is initiated in Radio A. Thereafter, as shown in FIG. 5, Radio A communicates a new cryptographic session key and an authorized node list to Radios B and J, which are its child nodes. This rekeying process occurs in accordance with the process previously described with respect to FIG. 2. Radios B and J proceed in accordance with the steps described in FIG. 3 to distribute the new cryptographic session key and authorized node list. As shown in FIG. 6, Radios B and J distribute these items to their respective child nodes which include Radios C, D, and Radios G, K. Referring now to FIG. 7, Radios D, G, and K following the process as described in FIG. 3 to distribute the new session key and authorized node list to their own respective child nodes. In this example, Radio D communicates this information to Radios E and F; Radio G communicates the information to Radios H and L; and Radio K distributes this information to Radios O and P. Finally, in FIG. 8, Radios H and P distribute the session key and authorized node list to their respective child nodes, following the process outlined in FIG. 3. In particular, Radio H distributes the information to Radios I and M; Radio P distributes the information to Radios N and Q as shown. At this point, all of the Radios in the network have received the new cryptographic session key as shown in FIG. 9.

From the previous discussion, it is clear that the inventive arrangements provide a practical method for over-the-air group rekey on low bandwidth networks. The method allows the amount of pre-placed key material and other mission preparations to be minimized. It is conceivable that a signed public-key certificate installed at time of manufacture might be all the preloaded material that is required at each node. The public key certificate would be used in such scenarios to establish a security association based on IKE, IPSec or any other suitable security protocol. Mathematical and computer simulations of the re-keying process as described herein demonstrate that Viral EKE can accomplish an over-the-air rekey in a short period of time even over low bandwidth systems. The method can be implemented so that it is automatic after the process has been initiated by a root key. Besides being convenient for wireless tactical applications, group rekey will be less error-prone and less likely to introduce issues such as stranded nodes. The method also offers the promise of eliminating the need for physical key fill under battlefield conditions, thus removing the risk of personnel harm or loss.

The invention described herein can be realized in a plurality of network nodes, each of which is under the control of a computer system. The computer system can have a computer program that can control the computer system such that it carries out the methods described herein. The invention can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Figure 10:
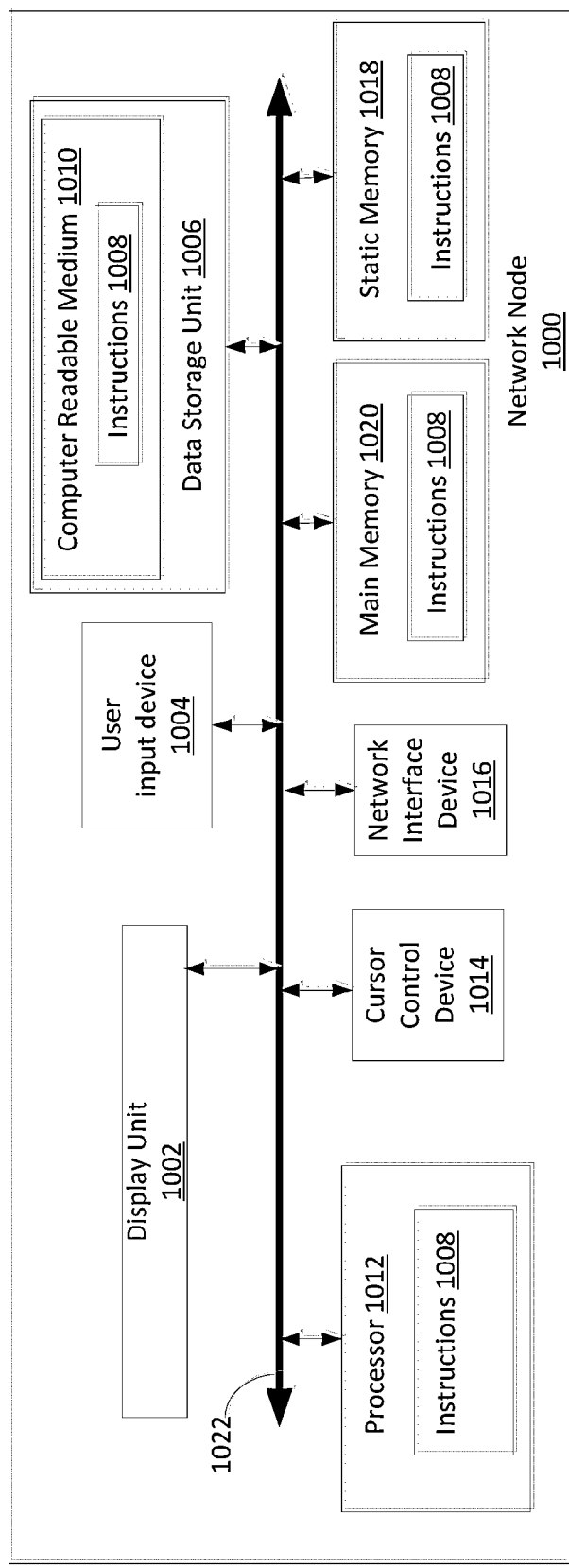
FIG. 10 is a drawing which is useful for understanding a structure of a communication node which can be used in the present invention.

Referring now to FIG. 10, a network node 1000 includes a processor 1012 (such as a central processing unit (CPU), a data storage unit 1006, a main memory 1020 and a static memory 1018, which communicate with each other via a bus 1022. The network node 1000 can further include a display unit 1002 (e.g., a liquid crystal display or LCD, a flat panel, or a solid state display). The network node 1000 can include a user input device 1004 (e.g., a keyboard), a cursor control device 1014 (e.g., a trackball or joystick) and a network interface device 1016. The network interface device 1016 can be a wired or wireless communications transceiver that is suitable for communicating with other network nodes as described herein.

The data storage unit 1006 comprises a computer-readable storage medium 1010 on which is stored one or more sets of instructions 1008 (e.g., software code) configured to implement one or more of the methodologies, procedures, or functions described herein. The instructions 1008 can also reside, completely or at least partially, within the main memory 1020, the static memory 1018, and/or within the processor 1012 during execution thereof by the processor. The main memory 1020 and the processor 1012 also can constitute machine-readable media.

Those skilled in the art will appreciate that the network node architecture illustrated in FIG. 10 is one possible example of a network node. However, the invention is not limited in this regard and any other suitable network node architectures can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

The term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

We claim:

1. A method for securely distributing a group session cryptographic key for a group communication session to a plurality of communication nodes, comprising:
    initiating at least one pairwise key distribution session including a root node and at least one first communication node of a plurality of communication nodes;
    securely providing the group session cryptographic key to said first communication node participating in said pairwise key distribution session;
    performing at said first communication node a first propagated pairwise key distribution session with at least one second communication node of said plurality of communication nodes which has not previously received said group session cryptographic key;
    securely providing group session cryptographic key from said first communication node to said second communication node;
    performing second propagated pairwise key distribution sessions at each of a plurality of third communication nodes which subsequently receives said group session cryptographic key until said group session cryptographic key has been securely provided to all authorized ones of said plurality of communication nodes; and
    communicating information between said authorized ones of said plurality of communication nodes in a group communication session using said group session cryptographic key;
    wherein (1) the root node communicates said group session cryptographic key to a fourth communication node in parallel with communication of the group session cryptographic key to the first communication node or (2) the first communication node communicates said group session cryptographic key to a fifth communication node in parallel with communication of the group session cryptographic key to the second communication node.

2. The method according to claim 1, wherein said pairwise key distribution session is established by said root node exclusively with one or more of said plurality of communication nodes which are child nodes of said root node.

3. The method according to claim 1, wherein each said first and second propagated pairwise distribution sessions is established by respective nodes of said plurality of communication nodes exclusively with communication nodes which are child nodes thereof.

4. The method according to claim 1, further comprising terminating said first and second propagated pairwise key distribution sessions after said group session cryptographic key has been securely provided.

5. The method according to claim 1, wherein each of said first and second propagated pairwise key distribution sessions comprises an authentication process by which each communication node participating in said session is authenticated.

6. The method according to claim 5, wherein each of said first and second propagated pairwise key distribution sessions further comprises a process for establishing a security association between communication nodes participating therein, and wherein said process generates at least one cryptographic key which is exclusively used for said first or second propagated pairwise key distribution session.

7. The method according to claim 1, wherein said first or second propagated pairwise key distribution session comprises a process for establishing an internet key exchange (IKE) security association.

8. The method according to claim 1, further comprising generating a list sufficient to identify selected ones of said plurality of communication nodes which are authorized to be included in said group communication session, and communicating said list during said first and second propagated pairwise key distribution sessions.

9. The method according to claim 8, further comprising excluding from said first and second propagated pairwise key distribution sessions any of said communication nodes that are not authorized to be included in said group communication session.

10. The method according to claim 1, wherein said group communication session comprises communication among said plurality of communication nodes through a base station.

11. A communication system, comprising:
    a root node and a plurality of communication nodes, each comprising a computer processor device and a communication transceiver, said root node and said plurality of communication nodes configured to communicate in a group communication session using a group session cryptographic key;
    said root node responsive to a key distribution initiation event to
        initiate at least one pairwise key distribution session with at least one first communication node of a plurality of communication nodes, and
        securely provide the group session cryptographic key to said first communication node participating in said pairwise key distribution session;
    said first communication node configured to
        respond to receiving said group session cryptographic key by initiating a first propagated pairwise key distribution session with at least one second communication node which has not previously received said group session cryptographic key, and
        securely provide said group session cryptographic key to said second communication node; and
    wherein each of a plurality of third communication nodes is configured to perform a second propagated pairwise key distribution session until said group session cryptographic key has been securely provided to all authorized ones of said plurality of communication nodes;
    wherein (1) the root node communicates said group session cryptographic key to a fourth communication node in parallel with communication of the group session cryptographic key to the first communication node or (2) the first communication node communicates said group session cryptographic key to a fifth communication node in parallel with communication of the group session cryptographic key to the second communication node.

12. The communication system according to claim 11, wherein said root node is configured to establish said pairwise key distribution session exclusively with one or more of said plurality of communication nodes which are child nodes of said root node.

13. The communication system according to claim 11, wherein each said first and second propagated pairwise distribution sessions is established exclusively with communication nodes which are child nodes thereof.

14. The communication system according to claim 11, wherein said first and second propagated pairwise key distribution sessions are terminated after said group session cryptographic key has been securely provided.

15. The communication system according to claim 11, wherein an authentication process is performed during each of said first and second propagated pairwise key distribution sessions by which each communication node participating in said session is authenticated.

16. The communication system according to claim 15, wherein each of said first and second pairwise key distribution sessions comprise a process for establishing a security association between communication nodes participating therein, and wherein said process generates at least one cryptographic key which is exclusively used for said first or second propagated pairwise key distribution session.

17. The communication system according to claim 11, wherein said first or second propagated pairwise key distribution session comprises an internet key exchange (IKE) security association.

18. The communication system according to claim 11, wherein each of said plurality of communication nodes is configured to distribute to a child node during a propagated pairwise key distribution session a list sufficient to identify selected ones of said communication nodes which are authorized to be included in said group communication session.

19. The communication system according to claim 18, wherein each of said plurality of communication nodes is configured to exclude from said propagated pairwise key distribution session any of said communication nodes that are not authorized to be included in said group communication session.

20. The communication system according to claim 11, wherein said communication nodes communicate with each other during said group communication session through a base station.

* * * * *